United States Patent
Schmidt et al.

(10) Patent No.: US 12,181,055 B2
(45) Date of Patent: Dec. 31, 2024

(54) HYDRAULIC BALANCING CONTROL VALVE AND RIDE CONTROL SYSTEM INCORPORATNG SAME

(71) Applicant: HydraForce, Inc., Lincolnshire, IL (US)

(72) Inventors: Travis Schmidt, Oregon City, OR (US); James Draffkorn, Palatine, IL (US); Barry German, Buffalo Grove, IL (US)

(73) Assignee: HydraForce, Inc., Lincolnshire, IL (US)

(*) Notice: Subject to any disclaimer, the term of this patent is extended or adjusted under 35 U.S.C. 154(b) by 0 days.

(21) Appl. No.: 17/536,638

(22) Filed: Nov. 29, 2021

(65) Prior Publication Data

US 2022/0082171 A1    Mar. 17, 2022

Related U.S. Application Data

(63) Continuation of application No. 16/387,182, filed on Apr. 17, 2019, now Pat. No. 11,187,330.

(Continued)

(51) Int. Cl.
*F16K 11/07* (2006.01)
*E02F 9/22* (2006.01)
(Continued)

(52) U.S. Cl.
CPC ........ *F16K 11/0716* (2013.01); *E02F 9/2267* (2013.01); *F15B 1/027* (2013.01); *F15B 13/029* (2013.01); *F15B 2211/205* (2013.01); *F15B 2211/212* (2013.01); *F15B 2211/428* (2013.01); *F15B 2211/50563* (2013.01);
(Continued)

(58) Field of Classification Search
CPC .... F16K 11/0716; E02F 9/2267; F15B 1/021; F15B 1/027; F15B 13/029; F15B 13/042; F15B 2211/205; F15B 2211/212; F15B 2211/428; F15B 2211/50563; F15B 2211/513; F15B 2211/528; F15B 2211/57; F15B 2211/625; F15B 2211/7053;
(Continued)

(56) References Cited

U.S. PATENT DOCUMENTS 1,785,289 A    12/1930   Wilson
4,243,062 A    1/1981    Shelton
(Continued)

OTHER PUBLICATIONS

Bosch Rexroth AG, Mobile Hydraulics "Stabilising module" RE 64617/05.04 (4 pages).

(Continued)

*Primary Examiner* — William M McCalister
(74) *Attorney, Agent, or Firm* — Leydig, Voit & Mayer, Ltd.

(57) ABSTRACT

A balancing valve includes four ports. While the pressures at a pair of balancing ports of a hydraulic balancing valve are equal, the valve maintains two other ports in a closed position. Upon a pressure differential between the balancing ports, fluid communication can occur between one of the balancing ports and either of the other ports based upon the (Continued)

direction of the pressure differential. A hydraulic ride control system utilizes the balancing valve together with other control valves to provide ride control functionality.

20 Claims, 4 Drawing Sheets

Related U.S. Application Data

(60) Provisional application No. 62/658,937, filed on Apr. 17, 2018.

(51) Int. Cl.
*F15B 1/027* (2006.01)
*F15B 13/02* (2006.01)

(52) U.S. Cl.
CPC ... *F15B 2211/513* (2013.01); *F15B 2211/528* (2013.01); *F15B 2211/57* (2013.01); *F15B 2211/625* (2013.01); *F15B 2211/7053* (2013.01); *F15B 2211/7128* (2013.01); *F15B 2211/8606* (2013.01); *Y10T 137/2544* (2015.04); *Y10T 137/86702* (2015.04)

(58) Field of Classification Search
CPC ...... F15B 2211/7128; F15B 2211/8606; Y10T 137/2544; Y10T 137/86702
USPC ............................................. 137/625.68, 102
See application file for complete search history.

(56) References Cited

U.S. PATENT DOCUMENTS

| | | | |
|---|---|---|---|
| 4,413,650 | A | 11/1983 | Kropp |
| 4,491,153 | A | 1/1985 | Bartholomaus |
| 5,733,095 | A | 3/1998 | Palmer et al. |
| 9,726,296 | B2 | 8/2017 | Neubauer et al. |
| 10,801,638 | B2 * | 10/2020 | Hilzendegen ....... F15B 13/0402 |
| 2005/0252561 | A1 | 11/2005 | Strauss et al. |
| 2008/0035225 | A1 | 2/2008 | Tackes et al. |
| 2008/0163837 | A1 | 7/2008 | Daut |
| 2010/0139795 | A1 | 6/2010 | Holmes et al. |
| 2012/0012773 | A1 | 1/2012 | Fischer |
| 2012/0211686 | A1 | 8/2012 | Okamoto |
| 2014/0238007 | A1 | 8/2014 | Payne |
| 2015/0000774 | A1 * | 1/2015 | Sung .................. G05D 16/2024 137/624.27 |
| 2018/0080568 | A1 | 3/2018 | Bruck |
| 2018/0252330 | A1 | 9/2018 | Zaiser |
| 2019/0161328 | A1 * | 5/2019 | Sutar .................. F15B 13/0405 |

OTHER PUBLICATIONS

Bosch Rexroth AG, Mobile Hydraulics "Stabilising module" RE 64614/07.04 (8 pages).

Hydac International, "Mobile Technology Hoist Stabilization Unit HSE-10 E," 10.116.8.0/11.12 (4 pages).

* cited by examiner

HYDRAULIC BALANCING CONTROL VALVE AND RIDE CONTROL SYSTEM INCORPORATNG SAME

CROSS-REFERENCE TO RELATED APPLICATIONS

This patent application is a continuation to U.S. patent application Ser. No. 16/387,182, filed Apr. 17, 2019, and entitled, "Hydraulic Balancing Control Valve And Ride Control System Incorporating Same," which claims the benefit of priority to U.S. Provisional Patent Application No. 62/658,937, filed Apr. 17, 2018, and entitled, "Hydraulic Balancing Control Valve And Ride Control System Incorporating Same," which are incorporated in their entireties herein by this reference.

TECHNICAL FIELD

This patent disclosure relates generally to a hydraulic control valve and, more particularly, to a hydraulic balancing valve for controlling the pressure between two ports and a ride control system utilizing the balancing control valve.

BACKGROUND

Machines such as skid steer loaders, wheel loaders, telehandlers, tractors, etc., can include one or more actuator configured to selectively manipulate an implement such as a bucket. Typically, such actuator is a hydraulic actuator or cylinders controlled via a hydraulic actuator control system. The hydraulic actuator control system can include a combination of valves used to control the movement of the hydraulic actuator of the machine.

When carrying a load of material with an implement such as a bucket, the entire machine or the implement may bounce when encountering rough or uneven terrain or other obstacles. In order to reduce the bouncing, some machines are configured with a ride control system having an actuator to absorb pressure fluctuations in the in the actuators operatively associated with the implement. In doing so, it is typically desirable to maintain the pressure in the accumulator at the same pressure as that at the head or base end of the actuator.

Hydraulic ride control systems for material moving machines have utilized many different configurations. In some systems, a plurality of solenoid activated control valves are utilized to control the flow of hydraulic fluid between a pump, a tank, an accumulator, and one or more hydraulic cylinders. A solenoid activated control valve can control the flow of hydraulic fluid between the accumulator and the base end of the actuator to eliminate pressure differences between the two components. Each control valve can present a plurality of possible leak points and the solenoids can present possible control system faults.

A less complex ride control system can be provided through the use of an orifice between the accumulator and the base end of a hydraulic cylinder. Such an orifice system results in a soft, cushy or bouncy feel associated with the material moving linkage as a result of the open path between the accumulator and the hydraulic cylinder. The feel of the linkage can be adjusted by controlling the size of the orifice but with the tradeoff of reducing the effectiveness of the ride control functionality.

In still another even less complex ride control system, no load balancing is provided between the accumulator and the base end of the actuator. Upon activating the ride control system, the actuator will extend or retract (and thus move the implement and load) unless the pressure at the base end of the actuator is equal to that of the accumulator.

It will be appreciated that this background description has been created by the inventor to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of a hydraulic ride control system configured to control the hydraulic pressure of an accumulator based upon pressure differences between a hydraulic actuator and an accumulator. In another aspect, the present disclosure is directed to a hydraulic balancing valve that is particularly useful with a ride control system. In a further aspect, the present disclosure is directed to a method of operating a hydraulic ride control system using a hydraulic balancing valve.

In still another aspect, a hydraulic balancing valve includes a body, a spool and a biasing member. The body defines a bore, a charge port, a pump port, a tank port, and a control port, with each of the charge port, the pump port, the tank port, and the control port being in fluid communication with the bore. The spool is movably disposed within the bore for directing hydraulic fluid between the charge port and the pump port and between the charge port and the tank port. The spool includes a first pressure surface in fluid communication with the charge port and a second pressure surface in fluid communication with the control port, the first and second pressure surfaces facing in opposing relationship to each other. The spool is movable within the bore between: a first position in which the charge port and the tank port are in fluid communication with each other and the charge port and the pump port are in fluid isolation from each other, a second position in which the charge port, the tank port, and the pump port are in fluid isolation from each other, and a third positon in which the charge port and the pump port are in fluid communication with each other and the charge port and the tank port are in fluid isolation from each other. The biasing member is operatively connected to the body and spool to bias the spool to the second position and is configured to permit movement of the spool to the first position upon a first pressure differential between the first pressure surface and the second pressure surface and to permit movement of the spool to the third position upon a second pressure differential between the first pressure surface and the second pressure surface, with the second pressure differential being different from the first pressure differential.

In still a further aspect, a hydraulic ride control system includes a hydraulic cylinder, a reservoir of hydraulic fluid, an accumulator, a pump, a first control valve, a second control valve, and a hydraulic balancing valve. The hydraulic cylinder has a chamber, a rod end, and a base end. The reservoir of hydraulic fluid has a first fluid communication passage between the rod end of the hydraulic cylinder and the reservoir. The accumulator has a second fluid communication passage between the base end of the hydraulic cylinder and the accumulator. The pump has a third fluid communication passage between the pump and the accumulator. The first control valve is disposed along the first fluid communication passage to control fluid communication between the rod end of the hydraulic cylinder and the reservoir. The second control valve is disposed along the second fluid communication passage to control fluid communication between the base end of the hydraulic cylinder and the accumulator. The hydraulic balancing valve includes a body, a spool and a biasing member. The body defines a bore, a charge port, a pump port, a tank port, and a control port, with each of the charge port, the pump port, the tank port, and the control port being in fluid communication with the bore. The spool is movably disposed within the bore for directing hydraulic fluid between the charge port and the pump port and between the charge port and the tank port. The spool includes a first pressure surface in fluid communication with the charge port and a second pressure surface in fluid communication with the control port, the first and second pressure surfaces facing in opposing relationship to each other. The spool is movable within the bore between: a first position in which the charge port and the tank port are in fluid communication with each other and the charge port and the pump port are in fluid isolation from each other, a second position in which the charge port, the tank port, and the pump port are in fluid isolation from each other, and a third positon in which the charge port and the pump port are in fluid communication with each other and the charge port and the tank port are in fluid isolation from each other. The biasing member is operatively connected to the body and spool to bias the spool to the second position and is configured to permit movement of the spool to the first position upon a first pressure differential between the first pressure surface and the second pressure surface and to permit movement of the spool to the third position upon a second pressure differential between the first pressure surface and the second pressure surface, with the second pressure differential being different from the first pressure differential. The accumulator is in fluid communication with the charge port. The pump is in fluid communication with the pump port. The reservoir is in fluid communication with the tank port. The base end of the hydraulic cylinder is in fluid communication with the control port.

In an additional aspect, a method of operating a hydraulic balancing valve includes providing the hydraulic balancing valve, which includes a body, a spool, and a biasing member. The body defines a bore, a charge port, a pump port, a tank port, and a control port, with each of the charge port, the pump port, the tank port, and the control port being in fluid communication with the bore. The spool is movably disposed within the bore for directing hydraulic fluid between the charge port and the pump port and between the charge port and the tank port. The spool includes a first pressure surface in fluid communication with the charge port and a second pressure surface in fluid communication with the control port, the first and second pressure surfaces facing in opposing relationship to each other. The spool is movable within the bore between: a first position in which the charge port and the tank port are in fluid communication with each other and the charge port and the pump port are in fluid isolation from each other, a second position in which the charge port, the tank port, and the pump port are in fluid isolation from each other, and a third positon in which the charge port and the pump port are in fluid communication with each other and the charge port and the tank port are in fluid isolation from each other. The biasing member being operatively connected to the body and spool to bias the spool to the second position. The method further includes providing a first charge port pressure at the charge port and a first control port pressure at the control port, with the first charge port pressure and the first control port pressure being equal and the biasing member maintaining the spool at the second position, providing a second charge port pressure at the charge port and a second control port pressure at the control port, with the second charge port pressure being greater than the second control port pressure to define a first pressure differential between the charge port and the control port, and the first pressure differential moving the spool from the second position to the first position, and providing a third charge port pressure at the charge port and a third control port pressure at the control port, with the third charge port pressure being less than the third control port pressure to define a second pressure differential between the charge port and the control port, and the second pressure differential moving the spool from the second position to the third position.

Further and alternative aspects and features of the disclosed principles will be appreciated from the following detailed description and the accompanying drawings. As will be appreciated, the hydraulic valves, hydraulic circuits, and methods for controlling hydraulic fluid disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

Embodiments of a hydraulic ride control system, and a balancing valve for use therein, constructed in accordance with principles of the present disclosure are adapted to control the flow of hydraulic fluid between an accumulator and one or more hydraulic cylinders of a material moving machine, such as, a skid steer loader, for example. Embodiments of a hydraulic ride control system constructed in accordance with principles of the present disclosure can have the same or similar functionality as conventional circuits, but with reduced cost and complexity.

Embodiments of a hydraulic ride control system constructed in accordance with principles of the present disclosure can include a pair of actuatable control valves. In embodiments, a balancing valve can be provided to control the flow of hydraulic fluid so that ports of the balancing valve are fluidly connected to a pump, an accumulator, a tank and a hydraulic cylinder. In embodiments, the balancing valve is configured to prevent the flow through two of the ports of the cartridge valve that are fluidly connected to the pump and the tank when the pressure at two other ports of the cartridge valve that are fluidly connected to the accumulator and the hydraulic cylinder is equal. Upon a pressure imbalance between the ports fluidly connected to the accumulator and the hydraulic cylinder, flow is permitted between the port fluidly connected to the accumulator and one of the ports fluidly connected to the pump or the tank until the pressure at the two ports fluidly connected to the accumulator and the hydraulic cylinder is equal.

Embodiments of a hydraulic balancing valve constructed in accordance with principles of the present disclosure are adapted to control the flow of hydraulic fluid such as between an accumulator and one or more hydraulic cylinders operatively associated with a linkage of a material moving machine (e.g., skid steer loaders, telehandlers, wheel loaders, tractors, etc.). Embodiments of a hydraulic balancing valve constructed in accordance with principles of the present disclosure can prevent the flow through two of the ports of the balancing valve when the pressure at two balancing ports of the control valve are equal. Upon an imbalance between the two balancing ports, flow can be permitted between one of the balancing ports and one of the other ports until the flow at the balancing ports is equal.

Figure 1:
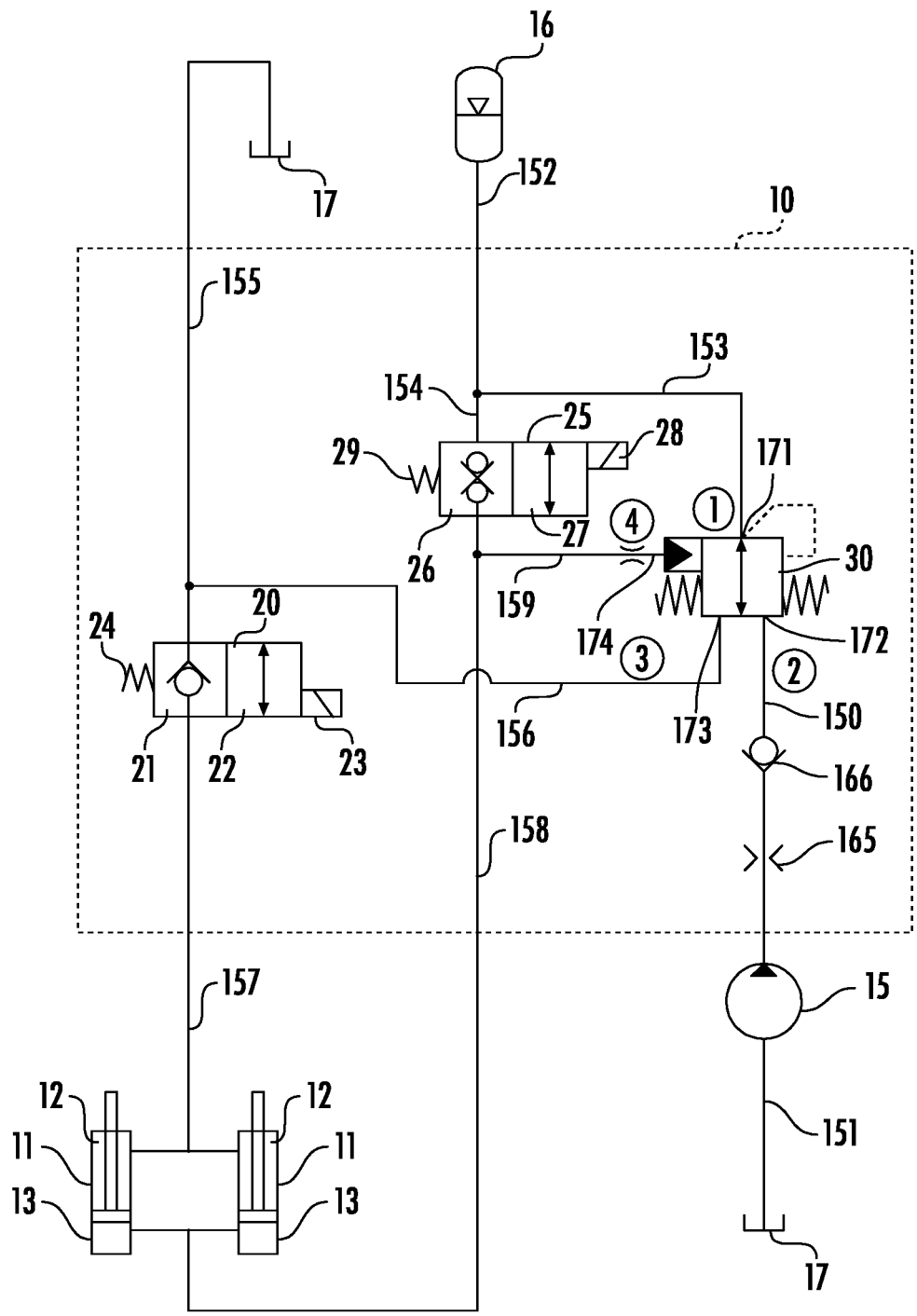
FIG. 1 is schematic view of an embodiment of a hydraulic circuit in accordance with principles of the present disclosure.

Turning now to the Figures, an embodiment of a hydraulic ride control system 10 constructed according to the principles of the present disclosure is shown in FIG. 1. In embodiments, the hydraulic ride control system 10 can be used to control the position of one or more hydraulic cylinders 11 used to move the lift arm or arms (not shown) of a material moving machine such as a skid steer loader (not shown). In embodiments, the hydraulic cylinders can be any suitable hydraulic cylinder that is acceptable for the intended application, as will be readily understood by one skilled in the art. In embodiments, the hydraulic cylinders 11 can be double acting cylinders with a rod end 12 and a head or base end 13.

A hydraulic ride control system 10 constructed according to principles of the present disclosure is adapted to be used to control the movement of the hydraulic cylinders 11 such as by reducing undesired movement of the cylinders during a material moving operation. More specifically, the hydraulic ride control system 10 can operate to maintain the position of the lift arms operatively connected to the hydraulic cylinders 11 as the machine is moved from a dig or load location to a dump location.

As depicted, the hydraulic ride control system 10 is operatively connected to the hydraulic cylinders 11 as well as a pump 15, an accumulator 16, and a tank 17. The hydraulic ride control system 10 comprises a first control valve 20, a second control valve 25, and a balancing control valve 30.

In embodiments, the pump 15 can be any suitable pump that it is acceptable for the intended application, as will be readily understood by one skilled in the art. In embodiments, the pump 15 can be a fixed-displacement pump or a variable-displacement pump. The pump 15 is in fluid communication with the balancing control valve 30 via a supply line 150. In embodiments, a flow orifice 165 and a check valve 166 can be positioned along the supply line 150. In embodiments, the flow orifice 165 can be any suitable flow orifice that is acceptable for the intended application, as will be readily understood by one skilled in the art. In embodiments, the flow orifice 165 operates to control the flow rate of hydraulic fluid along the supply line 150. In embodiments, the check valve 166 can be any suitable check valve that is acceptable for the intended application, as will be readily understood by one skilled in the art. In embodiments, the check valve 166 can operate to prevent flow of hydraulic fluid through the supply line 150 if the pressure in the supply line is less than a predetermined threshold.

The pump 15 can be in fluid communication with the tank 17 via any suitable technique. As depicted, the pump 15 is in fluid communication with the tank 17 via a pump supply line 151.

In embodiments, the accumulator 16 can be any suitable accumulator that it is acceptable for the intended application, as will be readily understood by one skilled in the art. In embodiments, the accumulator 16 can receive hydraulic fluid and utilize a compressible gas such as nitrogen to adjust the pressure of the accumulator. The accumulator 16 is in fluid communication with the balancing control valve 30 via an accumulator line 152 and an accumulator control line 153. In addition, the accumulator 16 is in fluid communication with the second control valve 25 via the accumulator line 152 and an accumulator valve line 154. In embodiments, the tank 17 can be any suitable tank that it is acceptable for the intended application, as will be readily understood by one skilled in the art. In embodiments, the tank 17 comprises a reservoir of hydraulic fluid which can be drawn into the pump 15 through pump supply line 151. In addition, the tank 17 is in fluid communication with the first control valve 20 via the tank line 155 and with the balancing control valve 30 via tank control line 156.

In embodiments, the first control valve 20 can be any suitable valve that it is acceptable for the intended application, as will be readily understood by one skilled in the art. In embodiments, the first control valve 20 can be a two position valve movable between a first position 21 and a second position 22. A solenoid assembly 23 can be adapted to selectively move the first control valve 20 between the first position 21 and the second position 22. In embodiments, the first control valve 20 can include one or more biasing members 24, such as a spring, to bias the first control valve to the first position 21. Other manners of actuating the first control valve 20 are contemplated.

The first control valve 20 is in fluid communication with the tank 17 via the tank line 155. The first control valve 20 is also in fluid communication with the rod end 12 of the hydraulic cylinder 11 via a rod end line 157.

At the first position 21, flow of hydraulic fluid is permitted in only one direction from the tank line 155 to the rod end 12 of the hydraulic cylinder 11 via rod end line 157. As a result, when in the first position 21, hydraulic fluid may not flow from the rod end 12 of hydraulic cylinder 11 to the tank 17. At the second position 22, hydraulic fluid may flow in both directions through the first control valve 20 between the tank line 155 and the rod end line 157 and thus between the rod end 12 of the hydraulic cylinder 11 and the tank 17.

In embodiments, the second control valve 25 can be any suitable valve that it is acceptable for the intended application, as will be readily understood by one skilled in the art. In embodiments, the second control valve 25 can be a two position valve movable between a first position 26 and a second position 27. A solenoid assembly 28 can be adapted to selectively move the second control valve 25 between the first position 26 and the second position 27. In embodiments, the second control valve 25 can include one or more biasing members 29, such as a spring, for example, to bias the second control valve to the first position 26. Other manners of actuating the second control valve 25 are contemplated.

The second control valve 25 is in fluid communication with the accumulator 16 via the accumulator line 152 and the accumulator valve line 154. The second control valve 25 is also in fluid communication with the base end 13 of the hydraulic cylinder 11 via a base end line 158 and with the balancing control valve 30 via base end control line 159.

At the first position 26, flow of hydraulic fluid is blocked from flowing between the accumulator valve line 154 and the base end line 158. As a result, when in the first position 26, hydraulic fluid may not flow between the base end 13 of hydraulic cylinder 11 and the accumulator 16 in either direction. At the second position 27, hydraulic fluid may flow in both directions through the second control valve 25 between the accumulator valve line 154 and the base end line 158.

In embodiments, the balancing control valve 30 can be any suitable valve that it is acceptable for the intended application, as will be readily understood by one skilled in the art. In embodiments, the balancing control valve 30 can be a cartridge-type mechanical valve having four ports with flow through the valve controlled by the pressure at certain of the ports. As depicted, the first port 171 is in fluid communication with the accumulator control line 153 and may be referred to herein as the charge port, the second port 172 is in fluid communication with the supply line 150 and may be referred to herein as the pump port, the third port 173 is in fluid communication with the tank control line 156 and may be referred to herein as the tank port, and the fourth port 174 is in fluid communication with the base end control line 159 and may be referred to herein as the control port.

Figure 2:
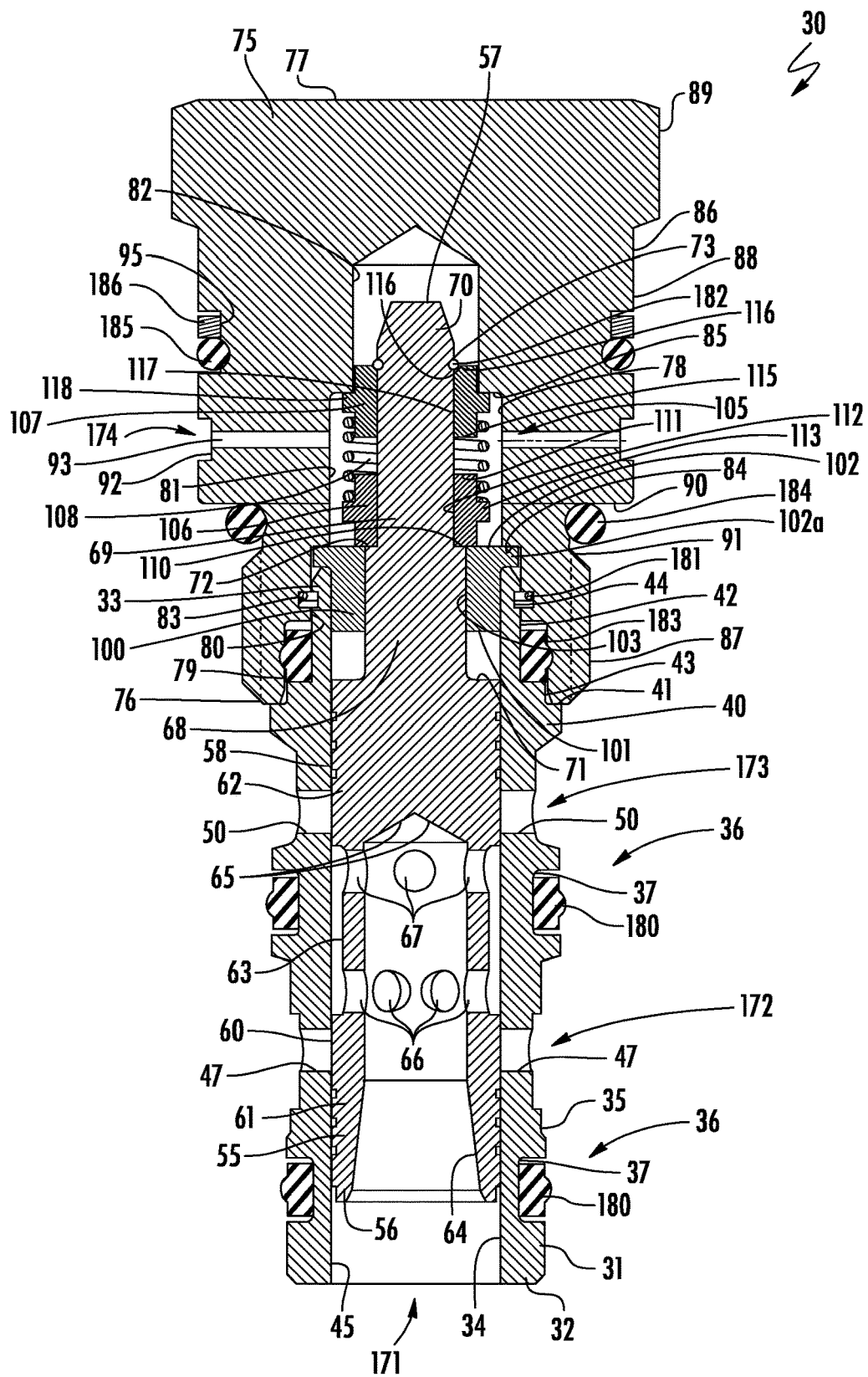
FIG. 2 is a cross-sectional view of an embodiment of a balancing valve in accordance with principles of the present disclosure.

Referring to FIG. 2, the balancing control valve 30 includes a cage 31, which is hollow and generally cylindrical, and a spool 55, which is generally cylindrical and slidably disposed within the cage. The cage 31 has a first end 32 and a second end 33, which is opposite the first end 32. The cage 31 defines a central bore 34 that extends along a longitudinal axis of the cage and between the first and second ends 32, 33.

In embodiments, an outer surface 35 of cage 31 can be adapted to be sealingly engaged with a suitable, mating valve body or housing (not shown). The illustrated outer surface 35 includes a pair of sealing sections 36 that are in spaced relationship to each other. Each sealing section 36 includes an annular groove 37 configured to receive therein a suitable annular sealing member such as a D-ring 180. The outer surface 35 of the cage 31 is stepped generally adjacent the second end 33 and includes an annular stop section 40 having an enlarged diameter spaced from the second end 33 defining an annular stop surface or shoulder 41. The outer surface 35 of the cage 31 further includes a first annular sealing and locking surface 42 that extends from the second end 33 towards the first end 32 and a second annular surface 43 between the annular stop section 40 and the first annular sealing and locking surface 42. The first annular sealing and locking surface 42 can include an annular groove 44 configured to receive a locking ring 181 therein.

An opening 45 at the first end 32 of the cage 31 defines the first port 171 of the balancing control valve 30. The cage 31 includes a set of first radial bores 47 that extends between the outer surface 35 and the central bore 34 to define the second port 172. The first radial bores 47 are disposed in a circumferentially spaced apart relationship relative to each other around the cage 31.

The cage 31 defines a set of second radial bores 50 that extends between the outer surface 35 and the central bore 34 to define a third port 173. The second radial bores 50 are disposed in a circumferentially spaced apart relationship relative to each other around the cage 31.

The spool 55 has a first end 56 and a second end 57 opposite the first end 56. An outer surface 60 of the spool 55 includes a first annular land 61 adjacent the first end 56 and a second annular land 62 spaced from the first land and disposed generally adjacent a midpoint 58 of the spool. An annular groove 63 is disposed between the first land 61 and the second land 62.

A central bore 64 extends along an axial centerline of the spool 55 from the first end 56 partway towards the second end 57. An end surface of the central bore 64 defines a pressure surface 65 operative to move the spool 55 as discussed in further detail below. A set of first spool radial bores 66 extends between the outer surface 60 of the spool 55 adjacent the lower end of the annular groove 63 and the central bore 66. The first spool radial bores 66 are disposed in a circumferentially spaced apart relationship relative to each other around the spool 55.

A set of second spool radial bores 67 extends between the outer surface 60 of the spool adjacent the upper end of the annular groove 63 and the central bore 64. The second spool radial bores 67 are disposed in a circumferentially spaced apart relationship relative to each other around the spool 55. The annular groove 63 is in fluid communication with the central bore 64 through the first and second spool bores 66, 67.

The spool 55 includes, sequentially from the second annular land 62 towards the second end 57 of the spool, a first reduced diameter section 68, a second reduced diameter section 69, smaller than the first reduced diameter section, and a tapered end section 70 that extends from the second section 69 to the second end 57 of the spool 55. An annular pressure surface or shoulder 71 is defined by the difference in diameter between the second annular land 62 and the first reduced diameter section 68. The pressure surface 65 of the central bore 64 and the annular pressure shoulder 71 are in opposing relationship to each other so that a sufficient pressure differential or imbalance between the pressure at the pressure surface 65 and the pressure at the annular pressure shoulder 71 can cause movement of the spool 55 within the bore 34 of the cage 31. An annular engagement shoulder 72 is defined by the difference in diameter between the first reduced diameter section 68 and the second reduced diameter section 69. The outer surface 60 of the spool 55 adjacent the intersection between the second reduced diameter section 69 and the tapered end section 70 can include an annular groove 73 configured to receive a locking ring 182 therein.

A cap 75 is disposed at the second end 33 of the cage 31 to enclose the bore 34 of the cage. The cap 75 has a first end 76 and a second opposite end 77 with a stepped bore 78 that extends from the first end towards the second end. The bore 34 of the cage 31 and the stepped bore 78 of the cap 75 define the bore of the balancing control valve 30. The stepped bore 78 includes, in sequence from the first end 76 towards the second end 77, an enlarged first section 79, a second section 80 having a smaller diameter than the first section, a third section 81 having a smaller diameter than the second section, and a fourth section 82 having a smaller diameter than the third section. The first section 79 is configured so that a portion thereof engages the second annular surface 43 of the outer surface 35 of the cage 31 when the first end 76 of the cap 75 abuts the stop surface 41 of the cage. An additional length of the first section 79 is spaced from the first annular sealing and locking surface 42.

A resilient annular seal 183, such as a D-ring, can be positioned between the first annular sealing and locking surface 42 and the first section 79.

The second section 80 of the stepped bore 78 is configured to be disposed adjacent the first annular sealing and locking surface 42 of the outer surface 35 of the cage 31. The second section 80 of the stepped bore 78 can include an annular groove 83 aligned with the annular groove 44 in the first annular sealing and locking surface 42 of the cage 31. The locking ring 181 can be positioned in the annular groove 44 of the first annular surface 42 and the annular groove 83 of the second section 80 to retain the cap 75 on the second end 33 of the cage 31.

The smaller diameter of the third section 81 of the stepped bore 78 relative to the diameter of the second section 80 defines a spool guide engagement shoulder 84 along the stepped bore. The smaller diameter of the fourth section 82 of the stepped bore 78 relative to the diameter of the third section 81 defines a biasing guide engagement shoulder 85 along the stepped bore.

The outer surface 86 of the cap 75 includes, in sequence from the first end 76 towards the second end 77, an reduced diameter threaded first section 87, a second section 88 having a larger diameter than the first section, and a tool engagement section 89 adjacent the second end 77. The larger diameter of the second section 88 of the outer surface 86 relative to the diameter of the first section 87 defines a shoulder 90 along the outer surface. The outer surface of the first section 87 includes an annular recess 91 adjacent the shoulder 90 with resilient annular seal, such as an O-ring 184, disposed therein.

The second section 88 of the outer surface 86 of the cap 75 includes two spaced apart annular grooves. The first annular groove 92 is in fluid communication with one or more radial bores 93 that extend between the first annular groove and the third section 81 of the stepped bore 78 and defines a fourth port 174 of the balancing control valve 30. The second annular groove 95 is positioned between the first annular groove 92 and the tool engagement section 89. The second annular groove 94 is configured to receive therein a suitable annular sealing member such as a suitable O-ring 185 and a support or back-up ring 186.

The tool engagement section 89 of the outer surface 86 of the cap 75 can be configured with a hexagonal cross-section to facilitate engagement with a tool to screw the balancing control valve 30 into a bore (not shown) in a valve housing (not shown). Upon mounting the balancing control valve 30 to the valve housing (not shown), the D-ring 180 closest to the first end 32 of the cage 31 interacts with the valve housing to seal the first port 171, the spaced apart pair of D-rings 180 interact with the valve housing to seal the second port 172, the D-ring 180 spaced from the first end 32 of the cage 31 (i.e., between the second port 172 and the third port 173) and the O-ring 184 interact with the valve housing to seal the third port 173, and the pair of O-rings 184, 185 interact with the valve housing to seal the fourth port 174.

An annular spool guide 100 is disposed within the first section 79 of the stepped bore 78 of the cap 75. The spool guide 100 includes a first end 101 and a second end 102 with a central bore 103 extending therebetween. The central bore 103 is configured to guide and support the first reduced diameter section 68 of the spool 55 as the spool slides within the cage 31. An enlarged flange 103 at the second end 102 of the spool guide 100 is disposed between the second end 33 of the cage 31 and the spool guide engagement shoulder 84 within the stepped bore 78 of the cap 75 to secure the spool guide within the balancing control valve 30.

A biasing guide assembly 105 is disposed within the second and third sections 80, 81 of the stepped bore 78 of the cap 75. The biasing guide assembly 105 includes a first annular biasing guide member 106, a second annular biasing guide member 107 spaced from the first biasing guide member, and a biasing member 108, such as a compression spring, positioned between the first and second biasing guide members. The first biasing guide member 106 includes a first end 110 and a second end 111 with a central bore 112 extending therebetween. The central bore 112 is configured to guide and support the second reduced diameter section 69 of the spool 55 as the spool slides within the cage 31. The first end 110 of the first biasing guide member 106 is also configured to engage both the engagement shoulder 72 of the spool 55 and the second end 102 of the spool guide 100. The first biasing guide member 106 can also include a flange 113 configured to engage the biasing member 108.

The second biasing guide member 107 includes a first end 115 and a second end 116 with a central bore 117 extending therebetween. The central bore 117 is configured to guide and support the second reduced diameter section 69 of the spool 55 as the spool slides within the cage 31. The second biasing guide member 107 can also include a flange 118 configured to engage the biasing member 108 on one side of the flange and engage the biasing guide engagement shoulder 85 of the stepped bore 78 of the cap 75 on an opposite side of the flange. The second end 116 of the second biasing guide member 107 is also configured to engage the locking ring 182 disposed within the annular groove 73 at the intersection between the second reduced diameter section 69 and the tapered end section 70.

Although the first and second biasing guide members 106, 107 are configured identically, in embodiments, other configurations are contemplated. For example, as depicted, the biasing member 108 is disposed between the flange 113 of the first biasing guide member 106 and the flange 118 of the second biasing guide member 107. In another configuration, the biasing member 108 can be secured or fixed to the first and second biasing guide members 106, 107.

In embodiments, the annular spool guide 100 and the biasing guide assembly 105 are configured to permit fluid communication from the third section 81 of the stepped bore 78 and the fourth section 82 of the stepped bore to the pressure shoulder 71 at the first reduced diameter section 68 of the spool 55. More specifically, sufficient clearance exists between the second reduced diameter section 69 of the spool 55 and the central bore 117 of the second biasing guide member 107 to permit hydraulic fluid within the fourth port 174 to flow between the second reduced diameter section 69 of the spool 55 and the central bore of the second biasing guide member 107 so that fluid can pass between the third and fourth sections 81, 82 of the stepped bore 78. In an alternate or additional embodiment, the spool 55 and/or the second biasing guide member 107 may include passages (not shown) to permit the flow of hydraulic fluid between the third section 81 of the stepped bore 78 and the fourth section 82 of the stepped bore.

In addition, hydraulic fluid within the fourth port 174 can flow between the second reduced diameter section 69 of the spool 55 and the first biasing guide member 106 and between the first reduced diameter section 68 of the spool and the spool guide 100 to reach the pressure shoulder 71 at the first reduced diameter section 68 of the spool. In an alternate or additional embodiment, the spool 55, the spool guide 100, and/or the first biasing guide member 106 may include passages (not shown) to permit the flow of hydraulic fluid from the third section 81 of the stepped bore 78 to the second section 82 of the stepped bore.

The balancing control valve 30 is configured so that the spool 55 is biased by the biasing guide assembly 105 to a fully closed position in which the flow of hydraulic fluid within or through the balancing control valve is blocked or prevented. More specifically, as depicted in FIG. 2, the cage 31, the spool 55, the cap 75, the spool guide 100, and the biasing guide assembly 105 are configured so that when the pressure between the first port 171 and the fourth port 174 are equal, the spool is positioned to block the flow of hydraulic fluid between the first port 171 and the second port 172 and between the first port 171 and the third port 173. Since the balancing control valve 30 is in its neutral or closed position when the pressures at the first port 171 and the fourth port 174 are equal, the first port and the fourth port are sometimes referred to herein as the balancing ports. It should be noted that, as configured, the fourth port 174 is never in fluid communication with the first, second, or third ports 171, 172, 173 through the balancing control valve 30.

Figure 3:
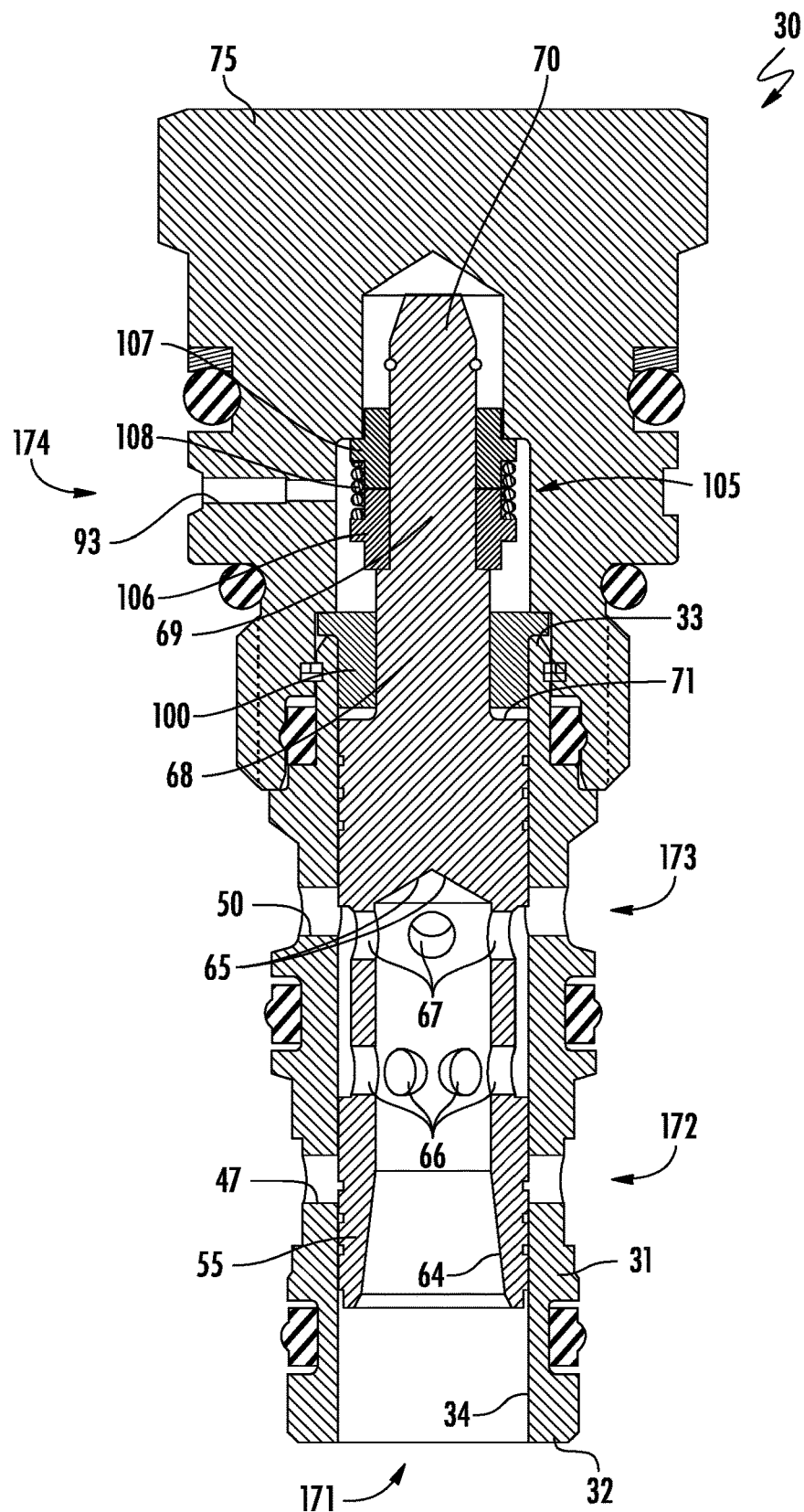
FIG. 3 is a cross-sectional view of the balancing valve of FIG. 2 with the spool in a first pressure imbalance position.

A difference in hydraulic pressure between the balancing ports (first port 171 and fourth port 174) will cause the spool 55 to shift or move upwards or downwards (as oriented in FIG. 2) to the position depicted in FIG. 3. More specifically, the first port 171 is in fluid communication with the pressure surface 65 of the central bore 64 and the fourth port 174 is in fluid communication with the annular pressure shoulder 71. Accordingly, if the pressure at the first port 171 is greater than the pressure at the fourth port 174, the pressure at the pressure surface 65 will be greater than the pressure at the annular pressure shoulder 71 causing the spool 55 to shift or move upwards. Upon moving the spool 55 upwards, the first reduced diameter section 68 of the spool 55 slides upwards within the spool guide 100. As the spool 55 moves upwards, the interaction between the engagement shoulder 72 of the spool with the first end 110 of the first biasing guide member 106 of the biasing guide assembly 105 causes the first biasing guide member 106 to move towards the second biasing guide member 107 and compresses the biasing member 108. The upward movement of the spool 55 also causes the upper end of the annular groove 63 of the spool 55 to become aligned with the third port 173. Since the annular groove 63 is in fluid communication with the first port 45 through the central bore 64 of the spool 55 and the first and second radial spool bores 66, 67, the first port is thus in fluid communication with the third port 173.

Figure 4:
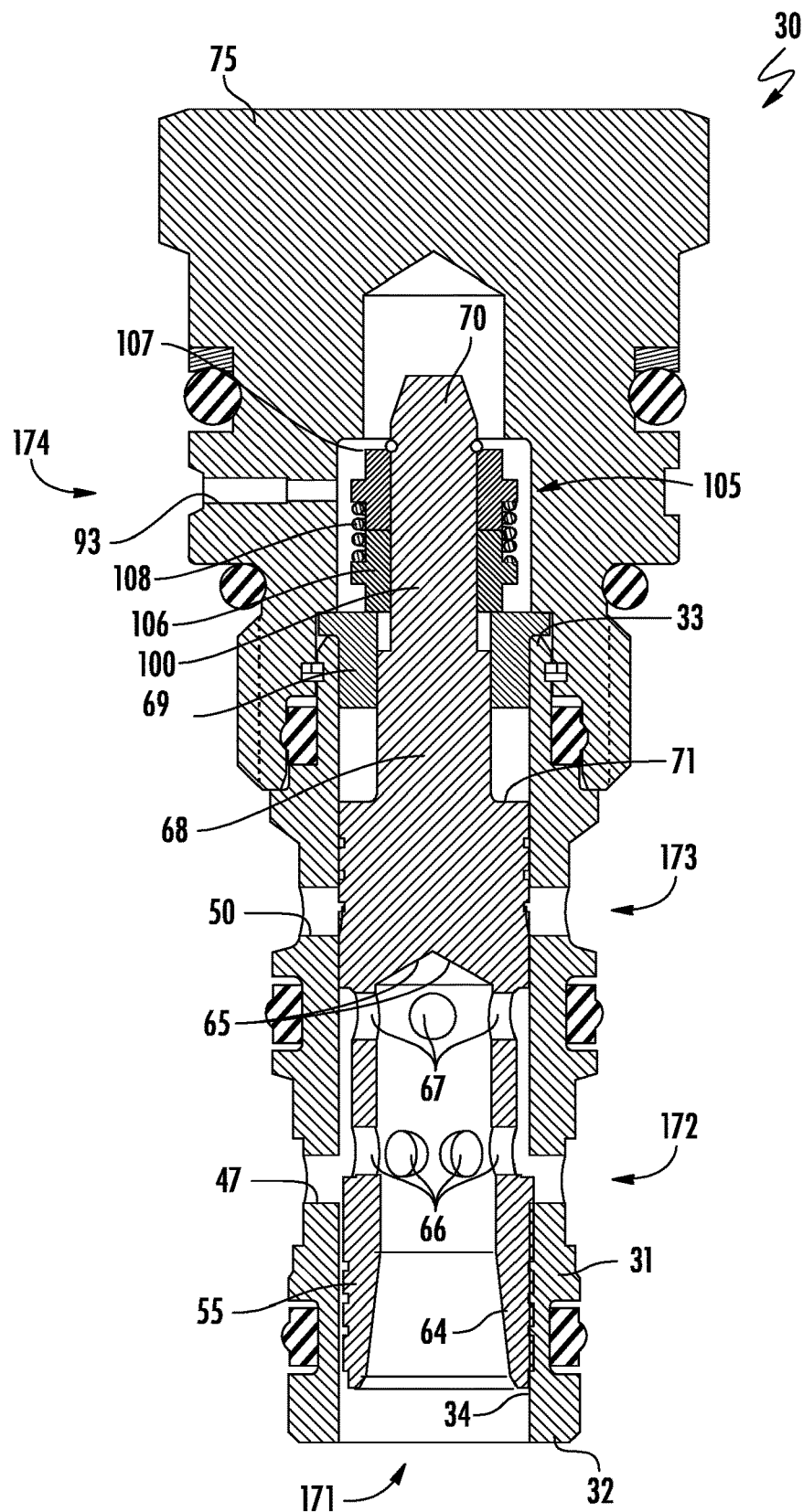
FIG. 4 is a cross-sectional view of the balancing valve of FIG. 2 with the spool in a second pressure imbalance position.

If the pressure at the first port 171 is less than the pressure at the fourth port 174, pressure at the pressure surface 65 will be less than the pressure at the annular pressure shoulder 71 causing the spool 55 to shift or move downwards to the position depicted in FIG. 4. Upon moving the spool 55 downwards, the first reduced diameter section 68 of the spool 55 slides downward within the spool guide 100 and the interaction between the locking ring 182 at the intersection of the second reduced diameter section 69 and the tapered end section 70 of the spool 55 with the second end 116 of the second biasing guide member 107 causes the second biasing guide member to move towards the first biasing guide member 106 and compresses the biasing member 108. The downward movement of the spool 55 also causes the lower end of the annular groove 63 of the spool 55 to become aligned with the second port 172 and thus establish fluid communication between the first port 45 and the second port through the central bore 64 of the spool 55.

As used herein, the balancing control valve 30 is sometimes referred to as a mechanical balancing control valve because the movement or control of the spool 55 within the cage 31 is controlled or caused by the spring force of the biasing member 105 and the pressure of the hydraulic fluid at the first and fourth ports 171, 174 as opposed to a solenoid assembly operating in conjunction with a biasing member in a manner similar to the first and second control valves 20, 25.

Referring to FIG. 1 in conjunction with FIG. 2, the first control valve 20 is depicted at its first position 21 and the second control valve 25 is depicted at its first position 26. Accordingly, the flow of hydraulic fluid from the rod end 12 of the hydraulic cylinder 11 to the tank 17 is prevented as is the flow of hydraulic fluid from the base end 13 of the hydraulic cylinder to the actuator 16. In such a configuration, the pressure at the first port 171 from the accumulator 16 equals the pressure at the fourth port 174 from the base end 13 of the hydraulic cylinder 11 so that the spool 55 will remain at its neutral or closed position as depicted in FIG. 2. As a result, the flow of hydraulic fluid from the pump 15 through the second port 172 and to the tank 17 through the third port 173 is prevented.

Upon operating the machine to perform a material lifting operation through the use of additional hydraulic circuitry (not shown) operatively connected to the hydraulic cylinders 11, the pressure at the base end 13 of the hydraulic cylinders will increase. The increase in pressure at the base end 13 of the hydraulic cylinders 11 increases the pressure at the fourth port 174 without a similar increase in pressure at the accumulator 16, and thus the first port 171. The resulting pressure differential between the first port 171 and the fourth port 174 causes the spool 55 to move downward (i.e., towards the first end 32 of the cage 31) which results in a portion of the annular groove 63 becoming aligned with the second port 172 (FIG. 4). As a result of the fluid communication between the annular groove 63 and the central bore 64, the first port 171 and the second port 172 are in fluid communication. The fluid communication between the first port 171 and the second port 172 permits hydraulic fluid to flow from the pump 15 through the second port to first port and then to the accumulator 16. Such fluid flow increases the pressure at the accumulator 16 and continues until the pressure at the accumulator equals the pressure at the base end 13 of the hydraulic cylinders 11, causing the spool 55 to shift upwards to the neutral or closed position as depicted in FIG. 2.

To activate the hydraulic ride control system 10, each of the first control valve 20 and the second control valve 25 are shifted to their respective second positions 22, 27. With the hydraulic ride control system 10 activated, hydraulic fluid can flow from the rod end 12 of the hydraulic cylinders 11 sequentially through the rod end line 157, the first control valve 20, and the tank line 155 to the tank 17. In addition, hydraulic fluid can flow from the base end 13 of the hydraulic cylinders 11 sequentially through the base end line 158, the second control valve 25, the accumulator valve line 154, and the accumulator line 152 to the accumulator 16.

Further, with the hydraulic ride control system 10 activated, the first port 171 and the fourth port 174 of the balancing control valve 30 are fluidly connected through the second control valve 25. As a result, the balancing control valve 30 is maintained at its neutral or closed position (as depicted in FIG. 2) with no hydraulic fluid passing through the second port 172 or the third port 173. Through such a configuration, the base end 12 of the hydraulic cylinders 11 is fluidly connected to the accumulator 16 to provide the desired ride control functionality.

As the machine on which the hydraulic ride control system 10 is disposed moves about the work site, a work implement operatively connected to the hydraulic cylinders 11 may tend to move up and down due to bumps and unevenness in the terrain. This movement of the work implement will tend to cause changes in the pressure at the base end 13 of the hydraulic cylinders 11. The change in pressure at the base end 13 of the hydraulic cylinders 11 will cause a pressure imbalance between the first port 171 and the fourth port 174 of the balancing control valve 30. As a result, there will be a pressure imbalance between the pressure surface 65 of the central bore 64 and the annular pressure shoulder 71. Depending upon whether the pressure is greater at the pressure surface 65 or the pressure shoulder 71, the spool 55 will move within the bore to fluidly connect either the first port 171 with the second port 172 or fluidly connect the first port 171 with the third port 173 to increase or decrease the pressure at the accumulator 16 until there is pressure balance between the first port 171 and the fourth port 174.

Upon or immediately prior to dumping a load of material at a dump location, the hydraulic ride control system 10 is deactivated and each of the first control valve 20 and the second control valve 25 are shifted to their respective first positions 21, 26. In doing so, the first port 171 and the fourth port 174 are no longer in fluid communication through the second control valve 25. As a result, upon dumping the load of material, the pressure at the base end 13 of the hydraulic cylinders 11 (and thus at the fourth port 174) is greater than the pressure at the accumulator 16 (and thus at the first port 171). The resulting pressure differential between the first port 171 (together with pressure surface 65) and the fourth port 174 (together with pressure shoulder 71) causes the spool 55 to move upward (i.e., towards the second end 33 of the cage 31) which results in a portion of the annular groove 63 becoming aligned with the third port 173 as depicted in FIG. 3. As a result of the fluid communication between the annular groove 63 and the central bore 64, the first port 171 and the third port 173 are in fluid communication. The fluid communication between the first port 171 and the third port 173 permits hydraulic fluid to flow from the accumulator 16 through the first port to third port and then to the tank 17. Such fluid flow decreases the pressure at the accumulator 16 and continues until the pressure at the accumulator equals the pressure at the base end 13 of the hydraulic cylinders 11, causing the spool 55 to shift downward to the neutral or closed position as depicted in FIG. 2.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hydraulic balancing valve, comprising:
   a body, the body defining a bore, a charge port, a pump port, a tank port, and a control port, each of the charge port, the pump port, the tank port, and the control port being in fluid communication with the bore;
   a spool, the spool fluidly isolating the control port from the charge port, the pump port, and the tank port, the spool being movably disposed within the bore for directing hydraulic fluid between the charge port and the pump port and between the charge port and the tank port, the spool including a first pressure surface in fluid communication with the charge port and a second pressure surface in fluid communication with the control port, the first and second pressure surfaces facing in opposing relationship to each other, the spool being movable within the bore between:
      a first position in which the charge port and the tank port are in fluid communication with each other and the charge port and the pump port are in fluid isolation from each other,
      a second position in which the charge port, the tank port, and the pump port are in fluid isolation from each other, and
      a third positon in which the charge port and the pump port are in fluid communication with each other and the charge port and the tank port are in fluid isolation from each other; and
   a biasing member, the biasing member operatively connected to the body and spool to bias the spool to the second position and configured to permit movement of the spool to the first position upon a first pressure differential between the first pressure surface and the second pressure surface and to permit movement of the spool to the third position upon a second pressure differential between the first pressure surface and the second pressure surface, the second pressure differential being different from the first pressure differential.

2. The hydraulic balancing valve of claim 1, wherein the spool is disposed at the second position upon a pressure balance between the first pressure surface and the second pressure surface, the spool is disposed at the first position at the first pressure differential, and the spool is disposed at the third position at the second pressure differential.

3. The hydraulic balancing valve of claim 2, wherein at the first pressure differential, a pressure at the charge port is greater than a pressure at the control port, and at the second pressure differential, the pressure at the charge port is less than a pressure at the control port.

4. The hydraulic balancing valve of claim 1, wherein the body comprises a cage and a cap disposed on the cage, a first portion of the bore being defined by the cage and a second portion of the bore being defined by the cap.

5. The hydraulic balancing valve of claim 4, wherein the control port extends through the cap into the bore.

6. The hydraulic balancing valve of claim 1, wherein the spool includes a central bore and an annular groove in fluid communication with the central bore, the central bore in fluid communication with the charge port, a first portion of the annular groove being in fluid communication with the tank port in the first position and a second portion of the annular groove being in fluid communication with the pump port in the third position.

7. The hydraulic balancing valve of claim 6, wherein the first and second portions of the annular groove are axially spaced apart along the spool.

8. The hydraulic balancing valve of claim 6, wherein the spool includes a plurality of spool bores between the central bore and the annular groove.

9. The hydraulic balancing valve of claim 6, wherein the charge port is aligned with the central bore of the spool.

10. The hydraulic balancing valve of claim 6, wherein the first pressure surface is disposed within the central bore of the spool.

11. The hydraulic balancing valve of claim 10, wherein the second pressure surface comprises an annular surface.

12. The hydraulic balancing valve of claim 11, wherein the annular surface extends about an outer surface of the spool.

13. The hydraulic balancing valve of claim 1, wherein the biasing member is disposed within a portion of the bore in fluid communication with the control port.

14. The hydraulic balancing valve of claim 1, wherein the bore includes a first end and a second end, and in the first position, the spool is displaced from the second position towards the second end of the bore and in the third position, the spool is displaced from the second position towards the first end of the bore.

15. The hydraulic balancing valve of claim 14, wherein the first end of the bore is disposed generally adjacent the charge port.

16. The hydraulic balancing valve of claim 14, further comprising first and second biasing guide members disposed within the bore of the body, each of the first and second biasing guide members being spaced apart in a neutral position when the spool is in the second position, the first biasing guide member being displaced from the neutral position towards the second end of the bore and the second biasing guide member engaging a first shoulder within the bore when the spool is in the first position, and the first biasing guide member engaging a second shoulder within the bore and the second biasing guide member being displaced from the neutral position towards the first end of the bore when the spool is in the third position.

17. The hydraulic balancing valve of claim 16, wherein the first and second biasing guide members each have a central bore and the spool is movably disposed within the central bore of each biasing guide member.

18. The hydraulic balancing valve of claim 16, wherein the first and second biasing guide members are adjacent each other when the spool is in at least one of the first configuration and the third configuration.

19. The hydraulic balancing valve of claim 1, wherein the body comprises an elongated cylindrical cage and a cap disposed on the cage, the bore extends along a longitudinal axis of the cage, and the charge port is disposed along the longitudinal axis.

20. A method of operating a hydraulic balancing valve, comprising:
providing the hydraulic balancing valve, the hydraulic balancing valve including a body, a spool, and a biasing member, the body defining a bore, a charge port, a pump port, a tank port, and a control port, each of the charge port, pump port, tank port, and control port being in fluid communication with the bore, the spool being movably disposed within the bore for directing hydraulic fluid between the charge port and the pump port and between the charge port and the tank port, the spool including a first pressure surface in fluid communication with the charge port and a second pressure surface in fluid communication with the control port, the first and second pressure surfaces facing in opposing relationship to each other, the spool being movable within the bore between a first position in which the charge port and the tank port are in fluid communication with each other and the charge port and the pump port are in fluid isolation from each other, a second position in which the charge port, the tank port, and the pump port are in fluid isolation from each other, and a third positon in which the charge port and the pump port are in fluid communication with each other and the charge port and the tank port are in fluid isolation from each other, and the biasing member being operatively connected to the body and spool to bias the spool to the second position;
providing a first charge port pressure at the charge port and a first control port pressure at the control port, the first charge port pressure and the first control port pressure being equal and the biasing member maintaining the spool at the second position;
providing a second charge port pressure at the charge port and a second control port pressure at the control port, the second charge port pressure being greater than the second control port pressure to define a first pressure differential between the charge port and the control port, the first pressure differential moving the spool from the second position to the first position; and
providing a third charge port pressure at the charge port and a third control port pressure at the control port, the third charge port pressure being less than the third control port pressure to define a second pressure differential between the charge port and the control port, the second pressure differential moving the spool from the second position to the third position.

* * * * *